(12) United States Patent
Rosengren et al.

(10) Patent No.: US 10,324,565 B2
(45) Date of Patent: Jun. 18, 2019

(54) OPTICAL PROXIMITY SENSOR

(71) Applicant: Neonode Inc., Santa Clara, CA (US)

(72) Inventors: Per Rosengren, Solna (SE); Xiatao Wang, Solna (SE); Stefan Holmgren, Sollentuna (SE)

(73) Assignee: Neonode Inc., San Jose, CA (US)

( * ) Notice: Subject to any disclaimer, the term of this patent is extended or adjusted under 35 U.S.C. 154(b) by 1018 days.

(21) Appl. No.: 14/791,414

(22) Filed: Jul. 4, 2015

(65) Prior Publication Data
US 2015/0309665 A1 Oct. 29, 2015

Related U.S. Application Data

(63) Continuation-in-part of application No. 14/312,787, filed on Jun. 24, 2014, now Pat. No. 9,164,625, which
(Continued)

(51) Int. Cl.
*G01C 3/08* (2006.01)
*G06F 3/042* (2006.01)
(Continued)

(52) U.S. Cl.
CPC .......... *G06F 3/0421* (2013.01); *G01S 7/497* (2013.01); *G01S 17/48* (2013.01); *G06F 1/169* (2013.01);
(Continued)

(58) Field of Classification Search
CPC .. G06F 3/0421; G06F 3/0428; G06F 3/04883; G06F 1/169; G01S 17/48; G01S 7/497
(Continued)

(56) References Cited

U.S. PATENT DOCUMENTS 4,267,443 A 5/1981 Carroll et al.
5,070,411 A 12/1991 Suzuki
(Continued)

FOREIGN PATENT DOCUMENTS

DE 202014104143 U1 10/2014
EP 1906632 A2 4/2008
(Continued)

OTHER PUBLICATIONS

Van Loenen et al., Entertaible: A Solution for Social Gaming Experiences, Tangible Play Workshop, Jan. 28, 2007, pp. 16-19, Tangible Play Research and Design for Tangible and Tabletop Games, Workshop at the 2007 Intelligent User Interfaces Conference, Workshop Proceedings, Jan. 28, 2007.
(Continued)

*Primary Examiner* — Mark Hellner
(74) *Attorney, Agent, or Firm* — Soquel Group LLC

(57) ABSTRACT

A proximity sensor including a housing, light emitters mounted in the housing for projecting light out of the housing along a detection plane, light detectors mounted in the housing for detecting amounts of light entering the housing along the detection plane, whereby for each emitter-detector pair (E, D), when an object is located at a target position p(E, D) in the detection plane, corresponding to the pair (E, D), then the light emitted by emitter E is scattered by the object and is expected to be maximally detected by detector D, and a processor to synchronously activate emitter-detector pairs, to read the detected amounts of light from the detectors, and to calculate a location of the object in the detection plane from the detected amounts of light, in accordance with a detection-location relationship that relates detections from emitter-detector pairs to object locations between neighboring target positions in the detection plane.

7 Claims, 15 Drawing Sheets

Related U.S. Application Data is a continuation of application No. PCT/US2014/040112, filed on May 30, 2014, and a continuation-in-part of application No. 14/140,635, filed on Dec. 26, 2013, now Pat. No. 9,001,087.

(60) Provisional application No. 62/021,125, filed on Jul. 5, 2014, provisional application No. 61/986,341, filed on Apr. 30, 2014, provisional application No. 61/972,435, filed on Mar. 31, 2014, provisional application No. 61/929,992, filed on Jan. 22, 2014, provisional application No. 61/846,089, filed on Jul. 15, 2013, provisional application No. 61/838,296, filed on Jun. 23, 2013, provisional application No. 61/828,713, filed on May 30, 2013.

(51) Int. Cl.
  *G01S 17/48* (2006.01)
  *G06F 1/16* (2006.01)
  *G06F 3/0488* (2013.01)
  *G01S 7/497* (2006.01)

(52) U.S. Cl.
  CPC ........ *G06F 3/0428* (2013.01); *G06F 3/04883* (2013.01)

(58) Field of Classification Search
  USPC ...................................................... 356/4.01
  See application file for complete search history.

(56) References Cited

U.S. PATENT DOCUMENTS

| | | |
|---|---|---|
| 5,103,085 A | 4/1992 | Zimmerman |
| 5,162,783 A | 11/1992 | Moreno |
| 5,414,413 A | 5/1995 | Tamaru et al. |
| 5,463,725 A | 10/1995 | Henckel et al. |
| 5,880,462 A | 3/1999 | Hsia |
| 5,889,236 A | 3/1999 | Gillespie et al. |
| 5,900,863 A | 5/1999 | Numazaki |
| 5,977,888 A | 11/1999 | Fujita et al. |
| 6,161,005 A | 12/2000 | Pinzon |
| 6,421,042 B1 | 7/2002 | Omura et al. |
| 6,492,978 B1 | 12/2002 | Selig et al. |
| 6,646,633 B1 | 11/2003 | Nicolas |
| 6,690,365 B2 | 2/2004 | Hinckley et al. |
| 6,874,683 B2 | 4/2005 | Keronen et al. |
| 6,875,977 B2 | 4/2005 | Wolter et al. |
| 6,985,137 B2 | 1/2006 | Kaikuranta |
| 7,046,232 B2 | 5/2006 | Inagaki et al. |
| 7,162,124 B1 | 1/2007 | Gunn, III et al. |
| 7,221,462 B2 | 5/2007 | Cavallucci |
| 7,225,408 B2 | 5/2007 | O'Rourke |
| 7,232,986 B2 | 6/2007 | Worthington et al. |
| 7,518,738 B2 | 4/2009 | Cavallucci et al. |
| 7,659,887 B2 | 2/2010 | Larsen et al. |
| 7,924,264 B2 | 4/2011 | Ohta |
| 8,091,280 B2 | 1/2012 | Hanzel et al. |
| 8,115,745 B2 | 2/2012 | Gray |
| 8,120,625 B2 | 2/2012 | Hinckley |
| 8,169,404 B1 | 5/2012 | Boillot |
| 8,193,498 B2 | 6/2012 | Cavallucci et al. |
| 8,289,299 B2 | 10/2012 | Newton |
| 8,316,324 B2 | 11/2012 | Boillot |
| 8,350,831 B2 | 1/2013 | Drumm |
| 8,471,814 B2 | 6/2013 | LaFave et al. |
| 8,581,884 B2 | 11/2013 | Fahraeus et al. |
| 8,648,677 B2 | 2/2014 | Su et al. |
| 8,810,548 B2 * | 8/2014 | Ko .................... G06F 3/017 345/175 |
| 8,922,340 B2 | 12/2014 | Salter et al. |
| 9,050,943 B2 | 6/2015 | Muller |
| 9,223,431 B2 | 12/2015 | Pemberton-pigott |
| 2001/0043189 A1 | 11/2001 | Brisebois et al. |
| 2002/0075243 A1 | 6/2002 | Newton |
| 2002/0152010 A1 | 10/2002 | Colmenarez et al. |
| 2003/0034439 A1 | 2/2003 | Reime et al. |
| 2003/0174125 A1 | 9/2003 | Torunoglu et al. |
| 2004/0031908 A1 | 2/2004 | Neveux et al. |
| 2004/0056199 A1 | 3/2004 | O'Connor et al. |
| 2004/0090428 A1 | 5/2004 | Crandall et al. |
| 2004/0198490 A1 | 10/2004 | Bansemer et al. |
| 2005/0024623 A1 | 2/2005 | Xie et al. |
| 2005/0093846 A1 | 5/2005 | Marcus et al. |
| 2005/0133702 A1 | 6/2005 | Meyer |
| 2006/0028455 A1 | 2/2006 | Hinckley et al. |
| 2006/0077186 A1 | 4/2006 | Park et al. |
| 2006/0161870 A1 | 7/2006 | Hotelling et al. |
| 2006/0161871 A1 | 7/2006 | Hotelling et al. |
| 2006/0236262 A1 | 10/2006 | Bathiche et al. |
| 2006/0238517 A1 | 10/2006 | King et al. |
| 2006/0244733 A1 | 11/2006 | Geaghan |
| 2007/0077541 A1 | 4/2007 | Champagne et al. |
| 2007/0103436 A1 | 5/2007 | Kong |
| 2008/0012835 A1 | 1/2008 | Rimon et al. |
| 2008/0016511 A1 | 1/2008 | Ryder et al. |
| 2008/0089587 A1 | 4/2008 | Kim et al. |
| 2008/0096620 A1 | 4/2008 | Lee et al. |
| 2008/0100572 A1 | 5/2008 | Boillot |
| 2008/0100593 A1 | 5/2008 | Skillman et al. |
| 2008/0134102 A1 | 6/2008 | Movold et al. |
| 2008/0158172 A1 | 7/2008 | Hotelling et al. |
| 2008/0211779 A1 | 9/2008 | Pryor |
| 2008/0224836 A1 | 9/2008 | Pickering |
| 2009/0122027 A1 | 5/2009 | Newton |
| 2009/0135162 A1 | 5/2009 | Van De Wijdeven et al. |
| 2009/0139778 A1 | 6/2009 | Butler et al. |
| 2009/0153519 A1 | 6/2009 | Suarez Rovere |
| 2009/0166098 A1 | 7/2009 | Sunder |
| 2009/0173730 A1 | 7/2009 | Baier et al. |
| 2009/0195402 A1 | 8/2009 | Izadi et al. |
| 2009/0198359 A1 | 8/2009 | Chaudhri |
| 2009/0280905 A1 | 11/2009 | Weisman et al. |
| 2009/0322673 A1 | 12/2009 | Cherradi El Fadili |
| 2010/0013763 A1 | 1/2010 | Futter et al. |
| 2010/0031203 A1 | 2/2010 | Morris et al. |
| 2010/0134424 A1 | 6/2010 | Brisebois et al. |
| 2010/0185341 A1 | 7/2010 | Wilson et al. |
| 2010/0238138 A1 | 9/2010 | Goertz et al. |
| 2010/0238139 A1 | 9/2010 | Goertz et al. |
| 2010/0299642 A1 | 11/2010 | Merrell et al. |
| 2010/0321289 A1 | 12/2010 | Kim et al. |
| 2011/0005367 A1 | 1/2011 | Hwang et al. |
| 2011/0043325 A1 | 2/2011 | Newman et al. |
| 2011/0050639 A1 | 3/2011 | Challener et al. |
| 2011/0074734 A1 | 3/2011 | Wassvik et al. |
| 2011/0087963 A1 | 4/2011 | Brisebois et al. |
| 2011/0122560 A1 | 5/2011 | Andre et al. |
| 2011/0128234 A1 | 6/2011 | Lipman et al. |
| 2011/0128729 A1 | 6/2011 | Ng |
| 2011/0163996 A1 | 7/2011 | Wassvik et al. |
| 2011/0169773 A1 | 7/2011 | Luo |
| 2011/0169781 A1 | 7/2011 | Goertz et al. |
| 2011/0175852 A1 | 7/2011 | Goertz et al. |
| 2011/0179368 A1 | 7/2011 | King et al. |
| 2011/0179381 A1 | 7/2011 | King |
| 2011/0205186 A1 | 8/2011 | Newton et al. |
| 2011/0227874 A1 | 9/2011 | Fahraeus et al. |
| 2011/0242056 A1 | 10/2011 | Lee et al. |
| 2011/0309912 A1 | 12/2011 | Müller |
| 2011/0310005 A1 | 12/2011 | Chen et al. |
| 2012/0068973 A1 | 3/2012 | Christiansson et al. |
| 2012/0071994 A1 | 3/2012 | Lengeling |
| 2012/0098753 A1 | 4/2012 | Lu |
| 2012/0116548 A1 | 5/2012 | Goree et al. |
| 2012/0127317 A1 | 5/2012 | Yantek et al. |
| 2012/0131186 A1 | 5/2012 | Klos et al. |
| 2012/0133956 A1 | 5/2012 | Findlay et al. |
| 2012/0162078 A1 | 6/2012 | Ferren et al. |
| 2012/0188205 A1 | 7/2012 | Jansson et al. |
| 2012/0212457 A1 | 8/2012 | Drumm |
| 2012/0212458 A1 | 8/2012 | Drumm |
| 2012/0218229 A1 | 8/2012 | Drumm |

(56) References Cited

U.S. PATENT DOCUMENTS

| | | |
|---|---|---|
| 2012/0262408 A1 | 10/2012 | Pasquero et al. |
| 2013/0127790 A1 | 5/2013 | Wassvik |
| 2013/0234171 A1 | 9/2013 | Heikkinen et al. |
| 2013/0263633 A1 | 10/2013 | Minter et al. |
| 2014/0049516 A1 | 2/2014 | Heikkinen et al. |
| 2014/0069015 A1 | 3/2014 | Salter et al. |
| 2014/0104160 A1 | 4/2014 | Eriksson et al. |
| 2014/0104240 A1 | 4/2014 | Eriksson et al. |
| 2014/0291703 A1 | 10/2014 | Rudmann et al. |
| 2014/0320459 A1 | 10/2014 | Pettersson et al. |
| 2015/0015481 A1 | 1/2015 | Li |
| 2015/0227213 A1 | 8/2015 | Cho |

FOREIGN PATENT DOCUMENTS

| | | |
|---|---|---|
| JP | 10-148640 A | 6/1998 |
| JP | 3240941 B2 | 12/2001 |
| JP | 2003-029906 A | 1/2003 |
| JP | 2013-149228 A | 8/2013 |
| KR | 1020120120097 A | 11/2012 |
| KR | 1012682090000 B1 | 5/2013 |
| KR | 1020130133117 A | 5/2013 |
| KR | 1020130053363 A | 5/2014 |
| KR | 1020130053364 A | 5/2014 |
| KR | 1020130053367 A | 5/2014 |
| KR | 1020130053377 A | 5/2014 |
| KR | 1020130054135 A | 5/2014 |
| KR | 1020130054150 A | 5/2014 |
| WO | 2010011929 A1 | 1/2010 |
| WO | 2010134865 A1 | 11/2010 |
| WO | 2012017183 A1 | 2/2012 |
| WO | 2012089957 A1 | 7/2012 |
| WO | 2012089958 A1 | 7/2012 |
| WO | 2014041245 A1 | 3/2014 |
| WO | 2014194151 A2 | 12/2014 |

OTHER PUBLICATIONS

Hodges et al., ThinSight: Versatile Multitouch Sensing for Thin Form-Factor Displays, UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.

Moeller et al., ZeroTouch: An Optical Multi-Touch and Free-Air Interaction Architecture, Proc. CHI 2012 Proceedings of the 2012 Annual Conference Extended Abstracts on Human Factors in Computing Systems, May 5, 2012, pp. 2165-2174, ACM, New York, NY, USA.

Moeller et al., ZeroTouch: A Zero-Thickness Optical Multi-Touch Force Field, CHI EA '11 Proceedings of the 2011 Annual Conference Extended Abstracts on Human Factors in Computing Systems, May 2011, pp. 1165-1170, ACM, New York, NY, USA.

Moeller et al., IntangibleCanvas: Free-Air Finger Painting on a Projected Canvas, CHI EA '11 Proceedings of the 2011 Annual Conference Extended Abstracts on Human Factors in Computing Systems, May 2011, pp. 1615-1620, ACM, New York, NY, USA.

Butler et al., SideSight: Multi-touch Interaction Around Smart Devices, UIST'08, Oct. 2008. http://131.107.65.14/en-us/um/people/shahrami/papers/sidesight.pdf.

Miyamoto et al., Basic Study of Touchless Human Interface Using Net Structure Proximity Sensors, Journal of Robotics and Mechatronics vol. 25 No. 3, 2013, pp. 553-558.

Miyamoto et al., Basic Study of Touchless Human Interface Using Net Structure Proximity Sensors, No. 12-3 Proceedings of the 2012 JSME Conference on Robotics and Mechanics, Hamamatsu, Japan, May 27-29, 2012, 2P1-P03(1) to 2P1-P03(3).

* cited by examiner

OPTICAL PROXIMITY SENSOR

CROSS REFERENCES TO RELATED APPLICATIONS

This application is a non-provisional of U.S. Provisional Application No. 62/021,125, entitled OPTICAL TOUCH SCREEN SYSTEMS, and filed on Jul. 5, 2014 by inventor Per Rosengren, the contents of which are hereby incorporated herein in their entirety.

This application is a continuation-in-part of U.S. application Ser. No. 14/312,787, entitled OPTICAL PROXIMITY SENSORS, now U.S. Pat. No. 9,164,625, and filed on Jun. 24, 2014 by inventors Stefan Holmgren, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Aman and Joseph Shain, the contents of which are hereby incorporated herein in their entirety.

U.S. application Ser. No. 14/312,787 is a continuation-in-part of U.S. application Ser. No. 14/140,635, entitled LIGHT-BASED PROXIMITY DETECTION SYSTEM AND USER INTERFACE, now U.S. Pat. No. 9,001,087, and filed on Dec. 26, 2013 by inventors Thomas Eriksson and Stefan Holmgren.

U.S. application Ser. No. 14/312,787 is a continuation of PCT Application No. PCT/US14/40112, entitled OPTICAL PROXIMITY SENSORS, and filed on May 30, 2014 by inventors Stefan Holmgren, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Åman and Joseph Shain.

PCT Application No. PCT/US14/40112 claims priority benefit from:
- U.S. Provisional Patent Application No. 61/828,713, entitled OPTICAL TOUCH SCREEN SYSTEMS USING REFLECTED LIGHT, and filed on May 30, 2013 by inventors Per Rosengren, Lars Sparf, Erik Rosengren and Thomas Eriksson;
- U.S. Provisional Patent Application No. 61/838,296, entitled OPTICAL GAME ACCESSORIES USING REFLECTED LIGHT, and filed on Jun. 23, 2013 by inventors Per Rosengren, Lars Sparf, Erik Rosengren, Thomas Eriksson, Joseph Shain, Stefan Holmgren, John Karlsson and Remo Behdasht;
- U.S. Provisional Patent Application No. 61/846,089, entitled PROXIMITY SENSOR FOR LAPTOP COMPUTER AND ASSOCIATED USER INTERFACE, and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht;
- U.S. Provisional Patent Application No. 61/929,992, entitled CLOUD GAMING USER INTERFACE, and filed on Jan. 22, 2014 by inventors Thomas Eriksson, Stefan Holmgren, John Karlsson, Remo Behdasht, Erik Rosengren, Lars Sparf and Alexander Jubner;
- U.S. Provisional Patent Application No. 61/972,435, entitled OPTICAL TOUCH SCREEN SYSTEMS, and filed on Mar. 31, 2014 by inventors Sairam Iyer, Karl Erik Patrik Nordstrom, Per Rosengren, Stefan Holmgren, Erik Rosengren, Robert Pettersson, Lars Sparf and Thomas Eriksson; and
- U.S. Provisional Patent Application No. 61/986,341, entitled OPTICAL TOUCH SCREEN SYSTEMS, and filed on Apr. 30, 2014 by inventors Sairam Iyer, Karl Erik Patrik Nordstrom, Lars Sparf, Per Rosengren, Erik Rosengren, Thomas Eriksson, Alexander Jubner and Joseph Shain.

The contents of these applications are hereby incorporated by reference in their entireties.

FIELD OF THE INVENTION

The field of the present invention is light-based touchscreens and proximity sensors.

BACKGROUND OF THE INVENTION

In the prior art, a one-dimensional array of proximity sensors is not accurate enough to determine a two-dimensional location of a pointer within a two-dimensional plane extending from the array.

SUMMARY

Robot measurements indicate that there is a pattern in the relative signal strengths that repeat within triangles spanned by three adjacent signals. The robot measurement is used to learn that pattern, so that a mapping is made from the relative signal strengths of three signals in a triangle, to the reflection location and strength of an obstacle within that triangle. Adjacent triangles give individual detection candidates, which are consolidated into one.

There is thus provided in accordance with an embodiment of the present invention a calibration tool for calibrating parameters of a proximity-sensor strip including a plurality of emitters E and detectors D, wherein the emitters and detectors are arranged such that the emitters project light out of the strip along a detection plane and the detectors detect light entering the strip along the detection plane, and for each emitter-detector pair (E, D), when an object is located at a target position p(E, D) in the detection plane, corresponding to the pair (E, D), then the light emitted by emitter E is scattered by the object and is expected to be maximally detected by detector D, the calibration tool including a reflective object placed parallel to the proximity sensor strip in the detection plane, the reflective object spanning the length of the proximity sensor, a mechanism for incrementally moving the reflective object towards or away from the proximity sensor along the detection plane, and a processor coupled with the proximity sensor strip and with the mechanism operable to (i) activate a plurality of the emitter-detector pairs (E, D) at each incremental move of the reflective object, (ii) measure detections detected by detector D of each activated pair, and (iii) calibrate the target positions p(E, D) in the detection plane according to the distances between the sensor strip and the reflective object at which maximum detections are measured.

There is additionally provided in accordance with an embodiment of the present invention a method for calibrating parameters of a proximity-sensor strip including a plurality of emitters E and detectors D, wherein the emitters and detectors are arranged such that the emitters project light out of the strip along a detection plane and the detectors detect light entering the strip along the detection plane, and for each emitter-detector pair (E, D), when the object is located at a target position p(E, D) in the detection plane, corresponding to the pair (E, D), then the light emitted by emitter E is scattered by the object and is expected to be maximally detected by detector D, the method including providing a reflective object spanning the length of the proximity sensor parallel to the proximity-sensor strip in the detection plane, incrementally moving the reflective object towards or away from the proximity sensor along the detection plane, at each incremental move of the object, activating a plurality of the emitter-detector pairs (E, D) to measure detections at detectors D, and calibrating the target positions p(E, D) in the detection plane according to the distances between the sensor strip and the reflective object at which maximum detections are measured.

There is further provided in accordance with an embodiment of the present invention a proximity sensor for identifying a location of a proximal object, including a housing, a plurality of light emitters, denoted E, mounted in the housing for projecting light out of the housing along a detection plane, a plurality of light detectors, denoted D, mounted in the housing, operable when activated to detect amounts of light entering the housing along the detection plane, whereby for each emitter-detector pair (E, D), when an object is located at a target position p(E, D) in the detection plane, corresponding to the pair (E, D), then the light emitted by emitter E is scattered by the object and is expected to be maximally detected by detector D, and a processor connected to the emitters and to the detectors, operable to synchronously activate emitter-detector pairs, to read the detected amounts of light from the detectors, and to calculate a location of the object in the detection plane from the detected amounts of light, in accordance with a detection-location relationship, denoted D→L, that relates detections from emitter-detector pairs to object locations between neighboring target positions in the detection plane.

BRIEF DESCRIPTION OF THE DRAWINGS

The present invention will be more fully understood and appreciated from the following detailed description, taken in conjunction with the drawings in which.

DETAILED DESCRIPTION

Throughout this description, the terms "source" and "emitter" are used to indicate the same light emitting elements, inter alia LEDs, and the terms "sensor" and "detector" are used to indicate the same light detecting elements, inter alia photo diodes.

Figure 1:
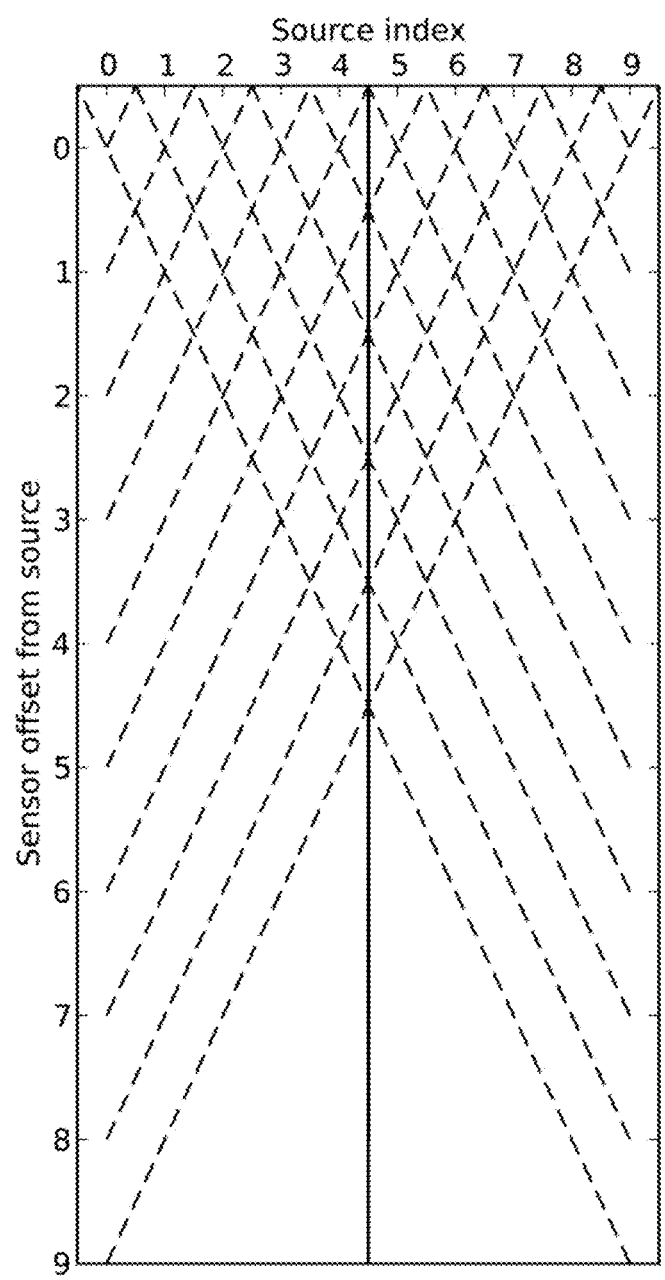
FIG. 1 is a simplified illustration of light emitted from light sources along the solid lines, and reflected along the dashed lines to light sensors, in accordance with an embodiment of the present invention.

Reference is made to FIG. 1, which is a simplified illustration of light emitted from light sources along the solid lines, and reflected along the dashed lines to light sensors, in accordance with an embodiment of the present invention. FIG. 1 shows how light is emitted straight out from sources in collimated beams. Light that hits an obstacle is reflected diffusely. Sensors detect incoming light from reflections in two narrow corridors that reach out from the sensor in two fixed directions—both at the same angle away from opposite sides of the light beams.

The amount of light that travels from one source to a sensor depends on how centered the obstacle is on the source's beam, and how centered it is on one of the sensor's corridors. Such a source/sensor pair is referred to as a "hotspot". The obstacle location that gives the highest amount of light for a hotspot is referred to as the "hotspot location" or the "target position" for that source/sensor pair. The device measures the transmitted amount of light for each hotspot, and each such measurement is referred to as a "hotspot signal value". The measurement normalizes all hotspot signal values so as to have the same range.

Since light that hits an obstacle is reflected diffusely and reflections are maximally detected in two narrow corridors at opposite sides of the light beams, the present specification refers to a forward-direction detection based on all of the narrow detection corridors in a first direction, and a backward-direction detection based on all of the narrow detection corridors in the second direction. Put differently, the forward direction includes all detections of emitter-detector pairs in which the detector of the pair has a higher location index than the emitter of the pair, and the backward direction includes all detections of emitter-detector pairs in which the detector of the pair has a lower location index than the emitter of the pair. The forward direction may be left or right, depending on device orientation. A hotspot where the sensor looks in the backward direction is referred to as a "backward hotspot", and a hotspot where the sensor looks in the forward direction is referred to as a "forward hotspot".

Figure 2:
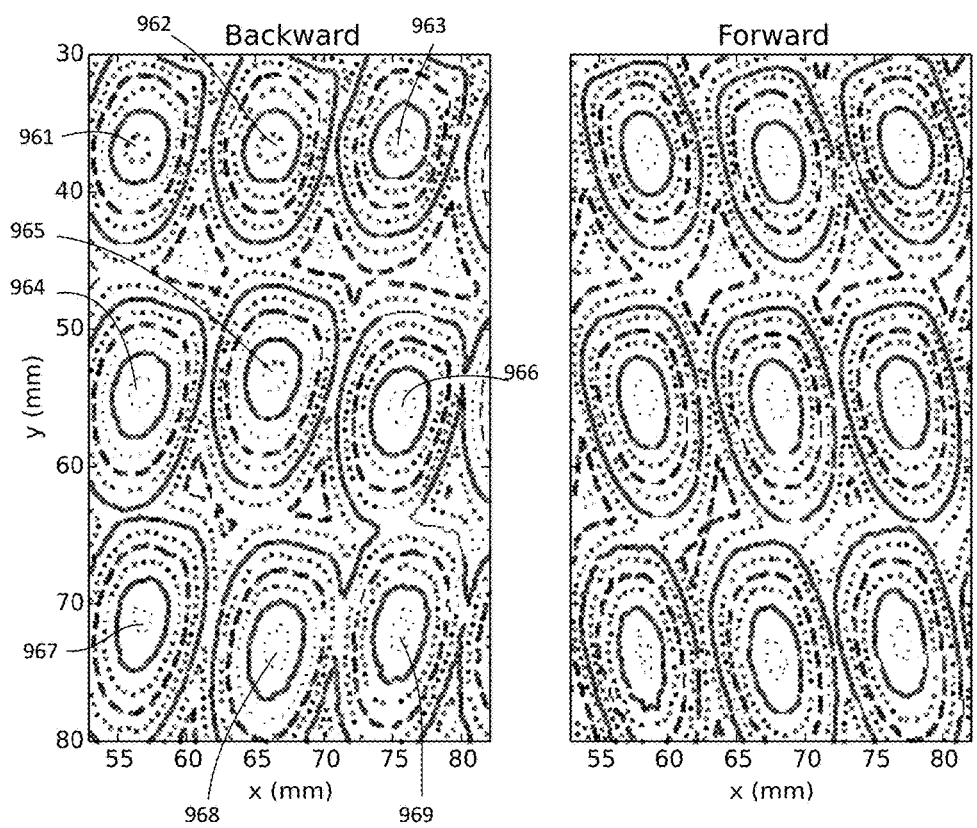
FIG. 2 is an illustration of backward-hotspot and forward-hotspot signal values, in accordance with an embodiment of the present invention.

Reference is made to FIG. 2, which is an illustration of backward-hotspot and forward-hotspot signal values, i.e., signal values for emitter-detector pairs, in accordance with an embodiment of the present invention. Hotspot signal values are sampled with an obstacle placed at locations in a dense grid spanning all hotspot locations, i.e., all locations at which an object can be placed such that the emitter-detector pairs will detect a reflection value. FIG. 2 shows the maximum of all hotspot signal values at obstacle locations within a region that spans 3×3 hotspot locations, or target positions, separately for backward and forward hotspots. In FIGS. 2-5 hotspot locations are indicated as numbered elements 961-969 only in the illustrations of backward-hotspot signal values. In FIGS. 2-5 the hotspot locations in the illustrations of forward-hotspot signal values are not indicated as numbered elements in order to avoid cluttering the figure.

Figure 3:
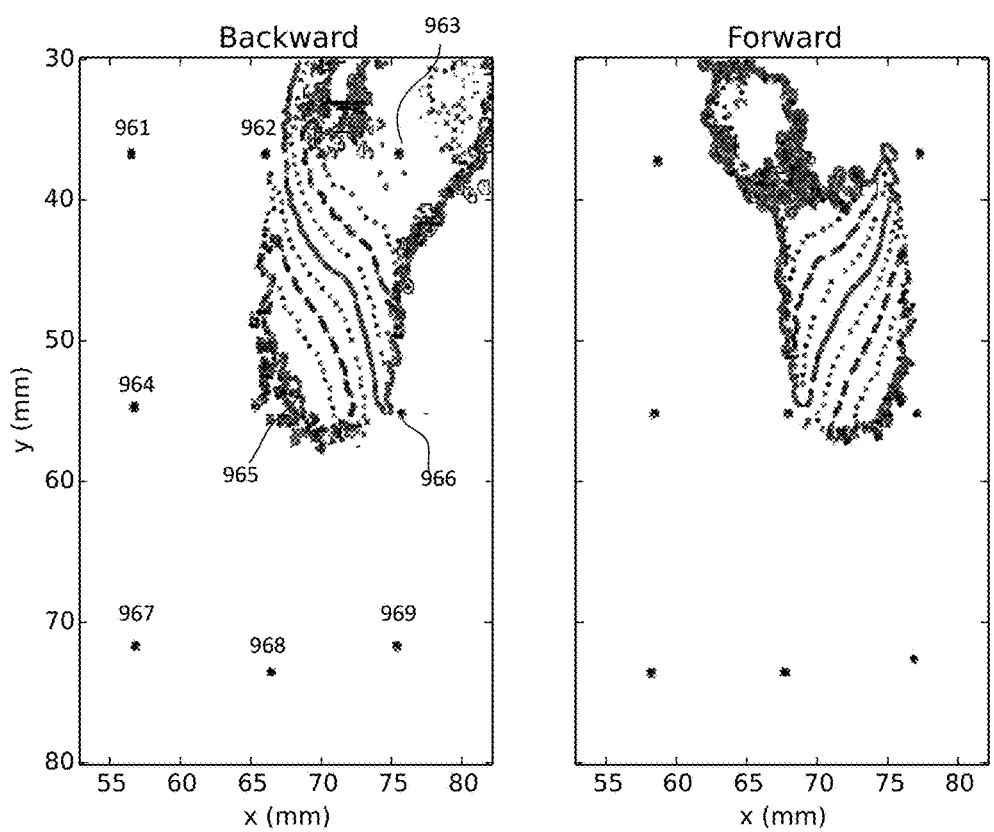
FIG. 3 is an illustration of the signal value relationship between top-middle and center hotspots, in accordance with an embodiment of the present invention.
Figure 4:
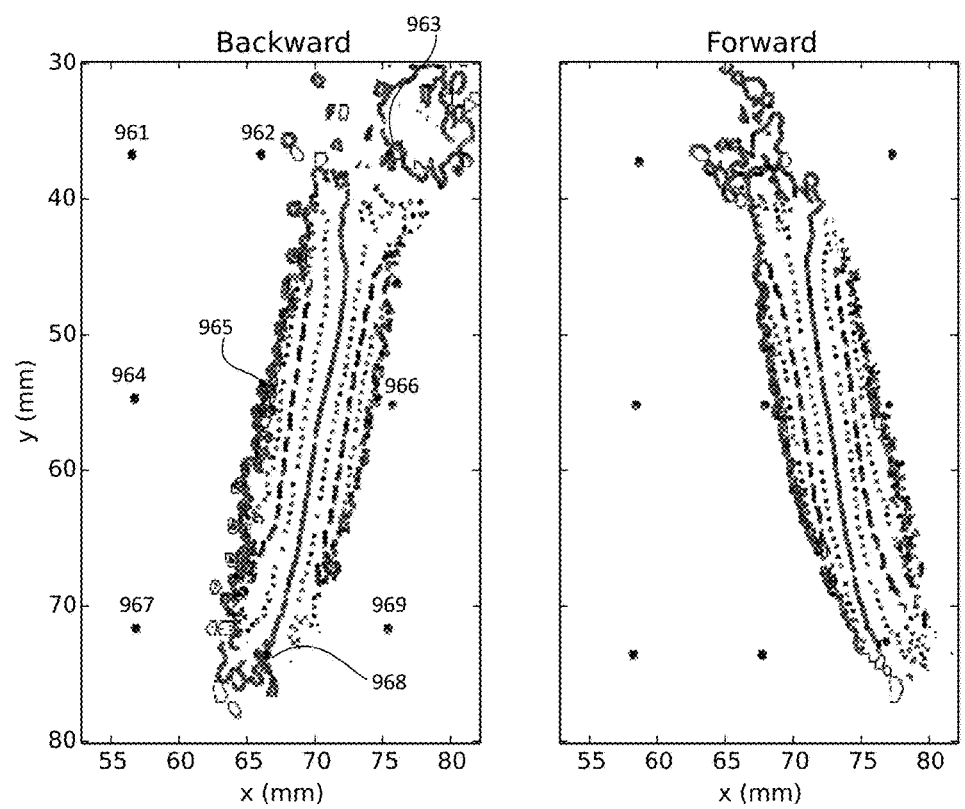
FIG. 4 is an illustration of the signal value relationship between right-middle and center hotspots, in accordance with an embodiment of the present invention.
Figure 5:
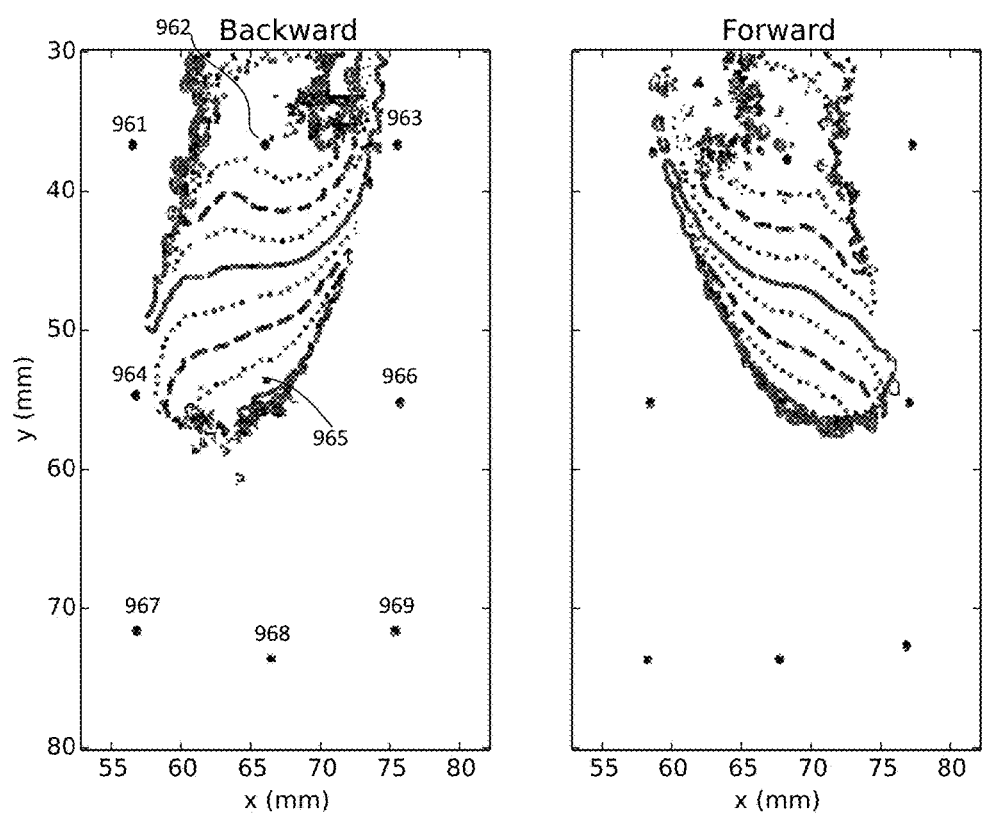
FIG. 5 is an illustration of the signal value relationship between top-right and center backward-hotspots, and top-middle and right-middle forward-hotspots, in accordance with an embodiment of the present invention.
Figure 6:
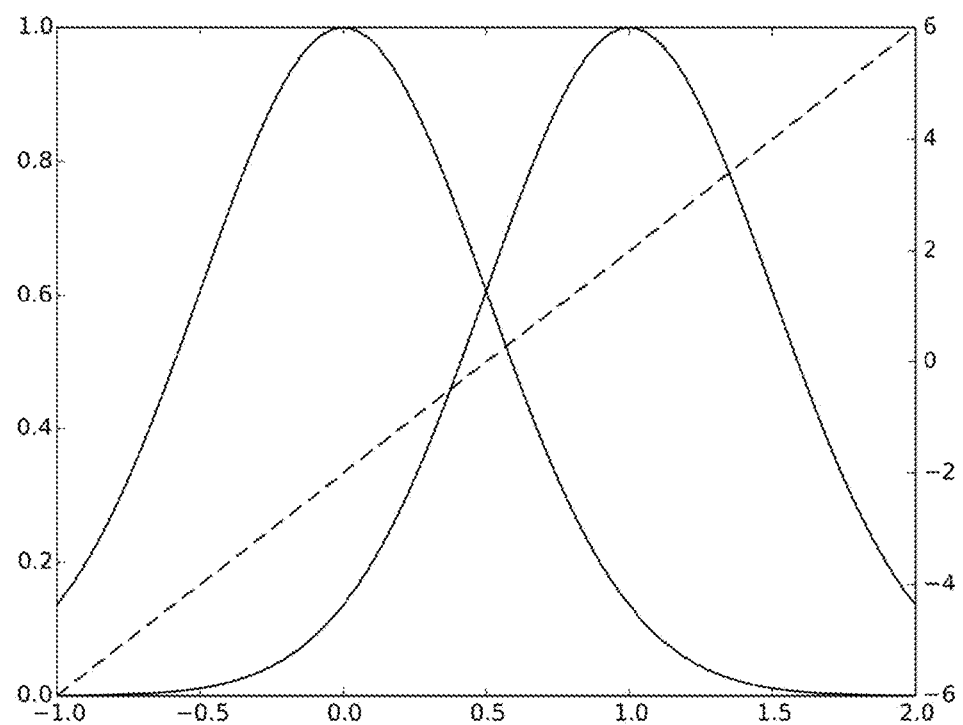
FIG. 6 is an illustration showing that the relationship between two signal values v0 and v1 (solid lines) is expressed as r=log(v1)−log(v0) (dashed line), in accordance with an embodiment of the present invention.

Reference is made to FIG. 3, which is an illustration of the signal value relationship between top-middle and center hotspots, in accordance with an embodiment of the present invention. Reference is also made to FIG. 4, which is an illustration of the signal value relationship between right-middle and center hotspots, in accordance with an embodiment of the present invention. Reference is also made to FIG. 5, which is an illustration of the signal value relationship between top-right and center backward-hotspots, and top-middle and right-middle forward-hotspots, in accordance with an embodiment of the present invention. FIGS. 3-5 show relationships between two adjacent hotspot signal values. Each curve follows a fixed relationship value, similar to a topological map. Reference is also made to FIG. 6, which is an illustration showing that the relationship between two signal values v0 and v1 (solid lines) is expressed as a difference of logarithms of the values (dashed line), in accordance with an embodiment of the present invention. FIG. 6 shows the relationship expressed as r=log(v1)−log(v0). This relationship is drowned in noise when either of the signal values is.

The signal value relationship between two vertically adjacent hotspots corresponds to a curve in FIG. 3. If the signal values are assumed to be normally distributed with a certain standard deviation, then that assumption may be used to find an interpolated location between the hotspot locations according to FIG. 6, referred to as a "crossing". It does the same for two vertically adjacent hotspots next to and at either side of the first, to create a second crossing. The rationale is that the obstacle location is somewhere between the two crossings. If the curves in FIG. 3 are all straight and parallel, this would be accurate. However, curvature causes inaccuracy.

To account for such curvature, the location between the crossings is found using the same method, but from the relationships of horizontally adjacent hotspots. The curves are now those in FIG. 4. Instead of finding horizontal crossings and selecting the location between both pairs of crossings, a shortcut is used. The vertical crossings are thought of as virtual hotspots, and each signal value is estimated based on the real hotspot signal values and the relative distance to each. The signal value relationship of the crossing's virtual hotspots gives the obstacle location directly.

Since the hotspot signal values for all obstacle locations have been recorded by a robot, finding a new obstacle location is achieved by finding the sample whose signals match those caused by the obstacle. This may not be efficient, though, due to high memory and high time complexity. Comparing the relationship between the highest signal values and those of adjacent hotspots should be sufficient.

Figure 7:
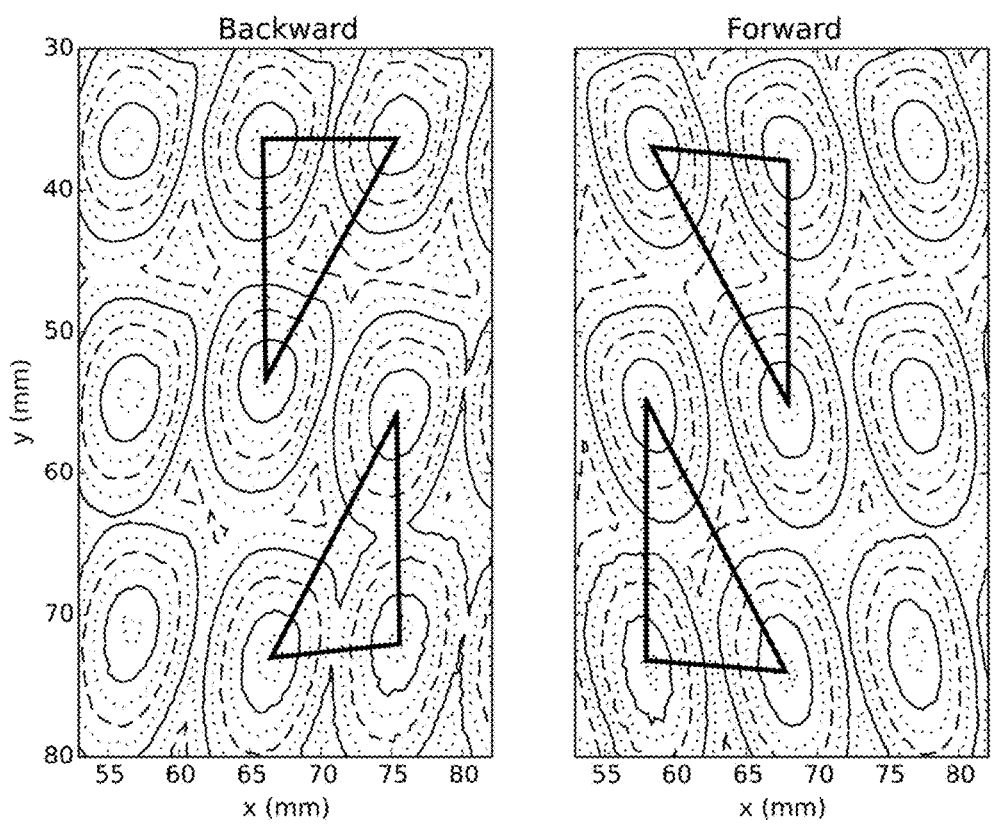
FIG. 7 is an illustration using triangles to mark areas in which all spanning hotspots' signal values are relatively strong, in accordance with an embodiment of the present invention.

Reference is made to FIG. 7, which is an illustration using triangles to mark areas in which all spanning hotspot signal values are relatively strong, in accordance with an embodiment of the present invention. The mapping from two-dimensional signal relationships to three-dimensional location and reflectivity is similar in all triangles; especially so in triangles of the same orientation in the same horizontal band. This means that the mapping needs to be learned and stored for only a few triangle groups. It may be observed in FIG. 2 that there are triangular areas spanned by three hotspots, in which those three hotspot signal values are all relatively high. Some of these are drawn in FIG. 7. This means that the three pairwise relationships between those signals will be above noise within the area. Out of those three relationships one is redundant, since it is derivable from the other two. Within such a triangle, two signal relationships map to a location within that triangle. It also maps to the reflectivity of the obstacle relative to the observed hotspot signal values. These triangular areas cover the whole screen, so the location and reflectivity of an obstacle is found by finding the triangle that is spanned by the hotspots with the highest signal values, and mapping the signal relationships to location and reflectivity.

The mapping transform takes the vertical (FIG. 3) and diagonal (FIG. 5) signal relationships as input. The input 2-D space, from minimum to maximum observed of each dimension, is covered by a 9×9 grid of nodes. Each node contains a location expressed in a frame of reference spanned by the triangle's edges. The location may be slightly outside of the triangle. It also contains a compensation factor, which when multiplied with the highest signal value gives the reflectivity of the obstacle. The four nodes closest to the input are interpolated with bi-linear interpolation.

All hotspots that have a signal value above a certain threshold, and that are stronger than all its eight neighbors, are evaluated for possible detections. All six triangles that use the maximum hotspot are screened as possible contributors to the detection. Each triangle is given a weight that is calculated as the product of all its hotspot signal values. The highest three are kept, and their weights are reduced by that of the fourth highest. The kept triangles are evaluated, and their results are consolidated to a weighted average, using the weights used for screening.

Finding strong signals around which to evaluate triangles, and tracking, may be performed as described in applicant's co-pending U.S. patent application Ser. No. 14/312,787, entitled OPTICAL PROXIMITY SENSORS, now U.S. Pat. No. 9,164,625, and filed on Jun. 24, 2014, the contents of which are hereby incorporated by reference.

Using a robot to place a stylus at known locations opposite the sensor and recording the resulting detection signals, enables quantifying accuracy of the algorithm. The recorded sample signal values are sent as input to the algorithm in random order, and the calculated detection locations based on these inputs are compared to the actual sample locations.

Figure 8:
FIG. 8 is an illustration showing detection error across a 100 by 64 mm touchscreen, in accordance with an embodiment of the present invention.

Reference is made to FIG. 8, which is an illustration showing detection error across a 100×64 mm touchscreen, in accordance with an embodiment of the present invention. The 2-D error vector is color coded according to the legend at the right in FIG. 8. The legend circle radius is 5 mm. FIG. 8 shows how large, and in what direction, the error is for samples across the screen.

Figure 9:
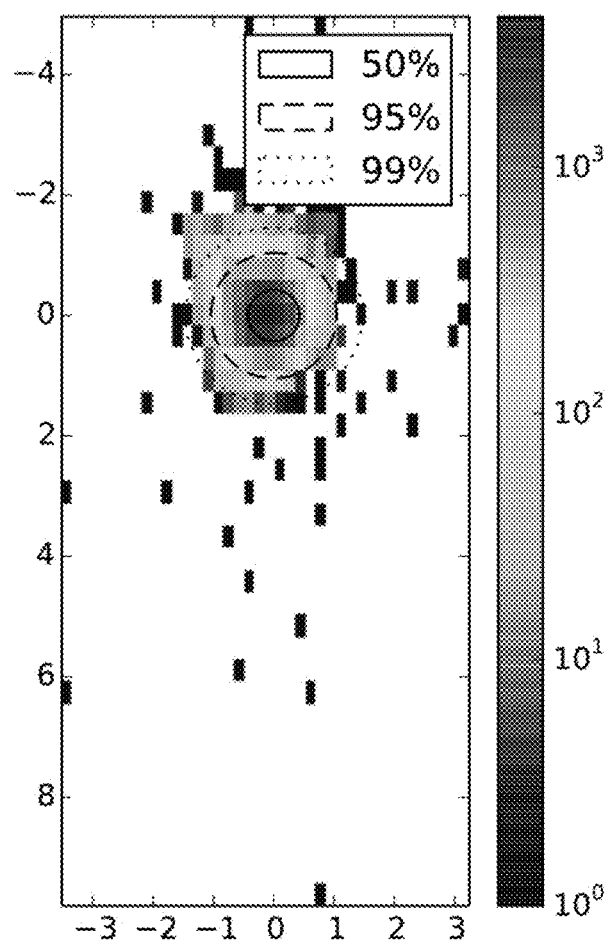
FIG. 9 is an illustration showing a 2-D histogram of sample-error vectors, in accordance with an embodiment of the present invention.

Reference is made to FIG. 9, which is an illustration showing a 2-D histogram of sample-error vectors, in accordance with an embodiment of the present invention. The units of the axes are mm. FIG. 9 shows the distribution of the errors. TABLE I below provides the quantified accuracy values.

| Measurement | Value |
| --- | --- |
| Error distances 50:th percentile | 0.43 mm |
| Error distances 95:th percentile | 1.04 mm |
| Error distances 99:th percentile | 1.47 mm |
| True positives | 100.0% |
| False positives | 0.0% |

Figure 10:
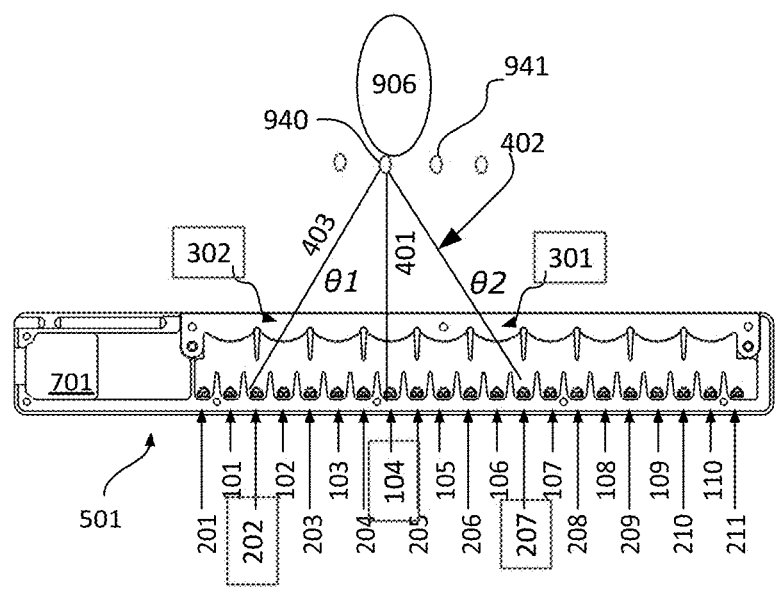
FIGS. 10 and 11 are simplified illustrations of a proximity sensor, in accordance with an embodiment of the present invention.
Figure 11:
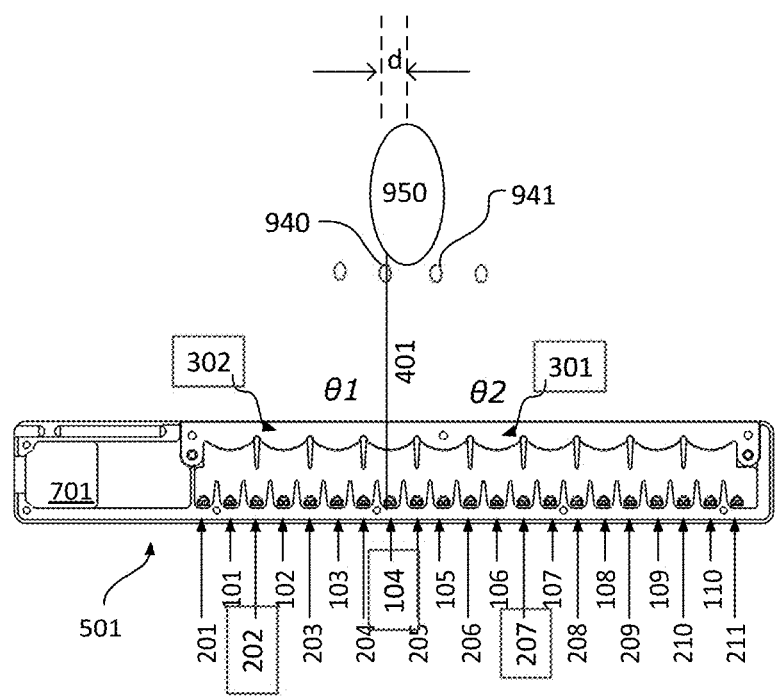

Reference is made to FIGS. 10 and 11, which are simplified illustrations of a proximity sensor, in accordance with an embodiment of the present invention. FIGS. 10 and 11 show a proximity sensor 501, according to the teachings of the present invention. Proximity sensor 501 includes light sources 101-110 and light sensors 201-211, each light source being situated between two of the sensors. Proximity sensor 501 also includes a plurality of lenses, such as lenses 301 and 302, being positioned in relation to two respective neighboring ones of the sensors such that light entering that lens is maximally detected at a first of the two sensors when the light enters that lens at an acute angle of incidence θ1, and light entering that lens is maximally detected at the other of the two sensors when the light enters that lens at an obtuse angle of incidence θ2. The lens is positioned in relation to the light source situated between the two sensors associated with that lens such that the light from the light source is collimated as it exits proximity sensor 501. This arrangement provides the two narrow corridors that extend from each sensor in two fixed directions away from opposite sides of the projected light beams discussed above with respect to FIG. 1.

As discussed above with respect to FIG. 1, the intersections outside proximity sensor 501 between the projected light beams and the corridors of maximum detection provide a map of hotspots. Four hotspots are illustrated in FIGS. 10 and 11, two of which are numbed 940 and 941. An object 950 is shown nearest hotspot 940 in FIG. 10. Thus, the maximum detection of object 950 is generated by source/sensor pairs 104/202 and 104/207. Source/sensor pair 104/202 provides backward detection, and source/sensor pair 104/207 provides forward detection, as discussed above. Additional detections are generated other by source/sensor pairs, e.g., forward detection source/sensor pair 105/208, because light beams from source 105 are scattered, and a portion thereof arrives at sensor 208, but the amount of light detected at sensor 208 is significantly less than that generated by source/sensor pair 104/207, because the scattered light arriving at sensor 208 does not travel on the corridor of maximum detection.

FIG. 11 shows proximity sensor 501 of FIG. 10, but object 950 is moved a distance d the right. In this case similar amounts of detection will be generated by forward source/sensor pairs 104/207 and 105/208. Each of these detections will be less than the detection generated by source/sensor pair 104/207 in FIG. 10 and greater than the detection generated by source/sensor pair 105/208 in FIG. 10, as explained above with reference to FIGS. 3-7. The location of object 950 between hotspots 940 and 941 is calculated by interpolating the amounts of light detected by source/sensor pairs 104/207 and 105/208. As discussed above with reference to FIG. 7, a location of object 950 is calculated by performing at least two interpolations between amounts of light detected by source/sensor pairs that correspond to three neighboring hotspots, the neighboring hotspots being the vertices of a triangle in the detection space.

In order to determine how to interpolate the detected amounts of light, detection sensitivities are calculated in the vicinities of the hotspots using a calibration tool that places a calibrating object having known reflective properties at known locations in the detection zone outside proximity sensor 501. At each known location, a plurality of emitter-detector pairs are synchronously activated and amounts of light detected by neighboring activated detectors are measured. Repetitive patterns in relative amounts of light detected by the neighboring activated detectors as the object moves among the known location are identified. These patterns are used to formulate detection sensitivities of proximity sensor 501 in the vicinities of the hotspots which are used to determine how to interpolate the amounts of light detected in order to calculate the location of a proximal object.

Figure 12:
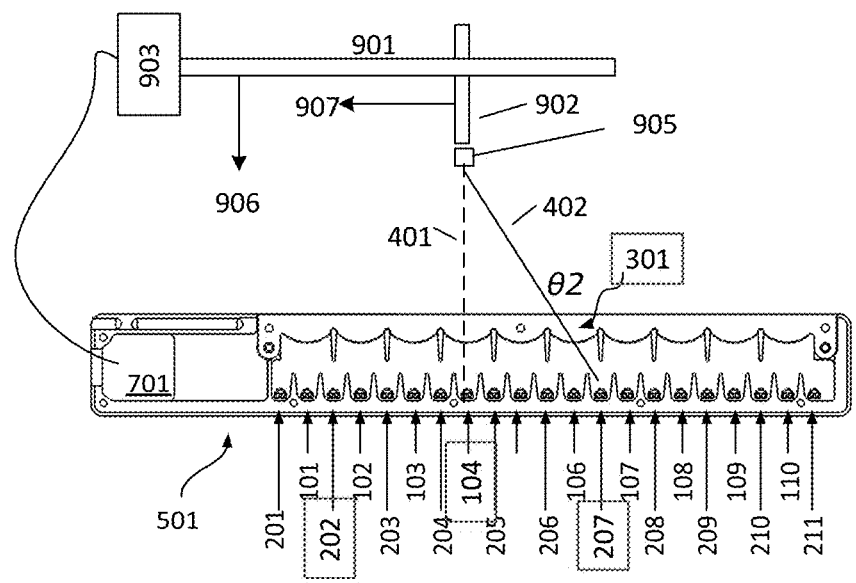
FIGS. 12 and 13 are simplified illustrations of calibration tools for the proximity sensor of FIGS. 10 and 11, in accordance with an embodiment of the present invention.
Figure 13:
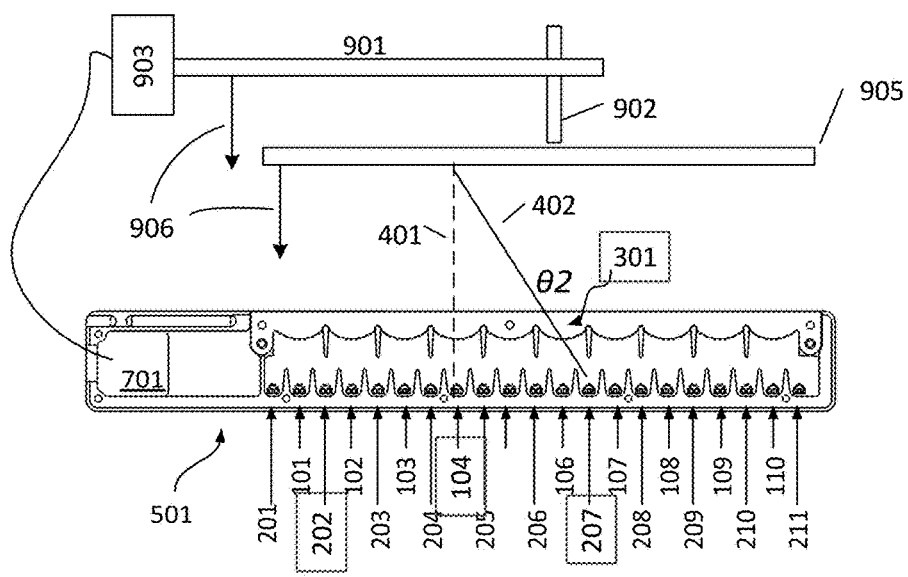

Reference is made to FIGS. 12 and 13, which are simplified illustrations of calibration tools for the proximity sensor of FIGS. 10 and 11, in accordance with an embodiment of the present invention. FIG. 12 shows a first calibration tool that includes motor 903, and shafts 901 and 902 that move reflective calibration object 905 horizontally and vertically in relation to proximity sensor bar 501, as indicated by arrows 906 and 907. At each location at which object 905 is placed, a plurality of source/sensor pairs that correspond to hotspots in the vicinity of that location are activated and the amounts of light detected are used to determine the sensitivity in the vicinity of those hotspots. Multiple such source/sensor pairs that share a common light source are activated simultaneously.

In some embodiments, the calibration tool, either that illustrated in FIG. 12 or that illustrated in FIG. 13, is used on certain representative units of proximity sensor 501, and the interpolation methods derived therefrom are applied to other similar units. In other embodiments however, either calibration tool is used on each unit of proximity sensor 501, in order to provide interpolations tailored to each individual proximity sensor.

FIG. 13 shows a second calibration tool that differs from that of FIG. 12 in the size and shape of calibration object 905. In FIG. 12 calibration object 905 is modeled as a finger or stylus typically used with proximity sensor bar 501, whereas in FIG. 13 calibration object 905 is a rod that spans the length of proximity sensor bar 501. The rod is covered in a material having reflective properties similar to those of skin or of a stylus typically used with proximity sensor bar 501. In the calibration tool of FIG. 13, shaft 902 remains at a fixed location on shaft 901, such that object 905 only moves toward and away from proximity sensor bar 501, as indicated by arrows 906. In this case, at each location of object 905 the light sources are activated one after the other and, during each light source activation, any of the light sensors 201-211 that may reasonably be expected to detect a significant reflection therefrom are activated. In some embodiments, all of the light sensors 201-211 are simultaneously activated with each light source activation.

In addition to determining interpolation methods, the calibration tools are used to map the locations of the hotspots that correspond to the source/sensor pairs. Often the locations of the hotspots are shifted from their expected locations due to mechanical issues such as imprecise placement or alignment of a light source or light detector within proximity sensor 501. When used to this end, numerous proximity sensor units need to be calibrated and the calibration tool of FIG. 13 is more efficient than that of FIG. 12.

Figure 14:
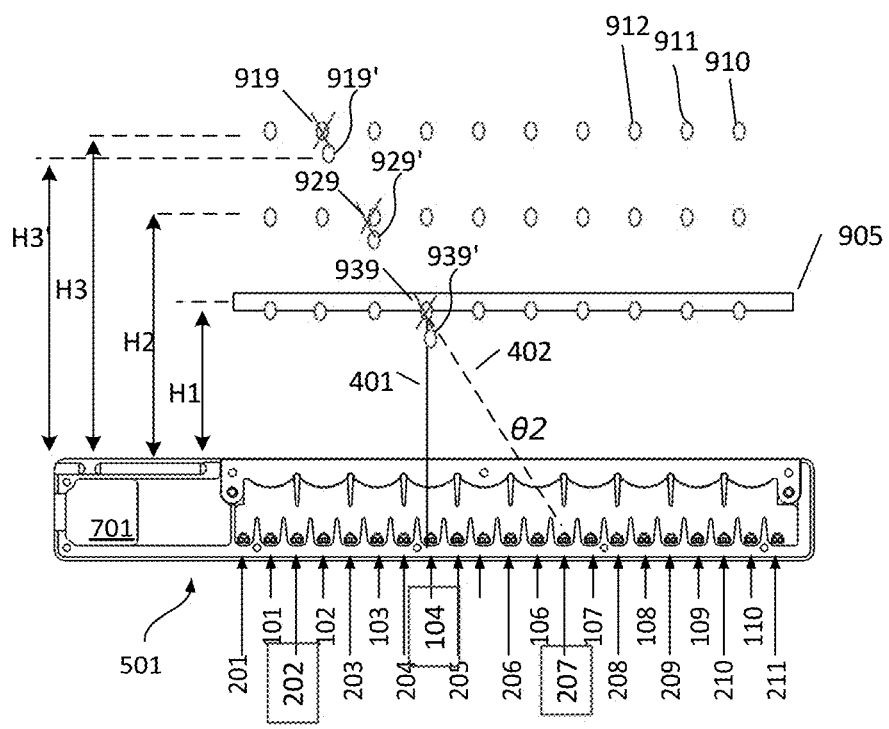
FIGS. 14 and 15 are simplified illustrations showing how the calibration tool of FIG. 13 identifies how the emitters and detectors of the proximity sensor have been mounted therein, in accordance with an embodiment of the present invention.
Figure 15:
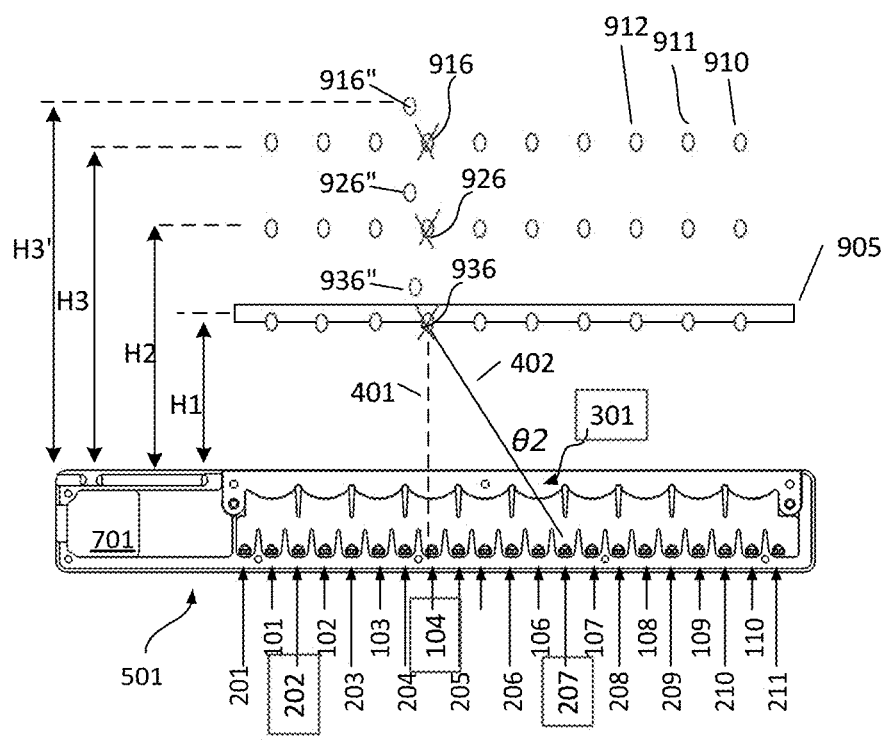

Reference is made to FIGS. 14 and 15, which are simplified illustrations showing how the calibration tool of FIG. 13 identifies how the emitters and detectors of the proximity sensor have been mounted therein, in accordance with an embodiment of the present invention. FIGS. 14 and 15 show how imprecise placement of a light sensor (FIG. 14) or a light source (FIG. 15) is identified by the calibration tool of FIG. 13. FIG. 14 shows three rows of hotspots including hotspots 910-912, 919, 929, and 939. These are expected hotspot locations, meaning that proximity sensor 501 is designed to provide maximum detections of reflected light for respective activated source/sensor pairs when an object is placed at these locations. This is verified as calibration rod 905 moves closer to proximity sensor 501. Each row of hotspots is situated at a fixed distance from proximity sensor 501. Three distances are shown: H1, H2 and H3.

FIG. 14 shows how, when light sensor 207 is placed slightly to the left of its correct position within proximity sensor 501, maximum detection measured at this light sensor corresponds to hotspot positions 919', 929' and 939'. Calibration rod 905 arrives in these positions at different distances than those expected. FIG. 14 illustrates how calibration rod 905 arrives at hotspot position 919' when it is a distance H3' from proximity sensor 501. By analyzing a series of local maximum detections that share a common light sensor and occur at different distances than those expected, the calibration system detects the offset of a light sensor from its expected position. In some embodiments processor 701 controls, or receives input from, motor 903 and processor 701 updates its map of hotspots according to the actual local maximum detections.

FIG. 15 shows how, when light source 104 is placed slightly to the left of its correct position within proximity sensor 501, maximum detection measured for source/sensor pairs that include light source 104 are shifted from expected hotspot positions 916, 926 and 936, to positions 916', 926' and 936'. FIG. 15 shows how calibration rod 905 arrives at hotspot position 916' when it is a distance H3' from proximity sensor 501. By analyzing a series of local maximum detections that share a common light source and occur at different distances than those expected, the calibration system detects the offset of the light source from its expected position.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A proximity sensor for identifying a location of a proximal object, comprising:
a housing;
a plurality of light emitters, denoted E, mounted in said housing for projecting light out of said housing along a detection plane;
a plurality of light detectors, denoted D, mounted in said housing, operable when activated to detect amounts of light entering the housing along the detection plane, whereby for each emitter-detector pair (E, D), when an object is located at a target position p(E, D) in the detection plane, corresponding to the pair (E, D), then the light emitted by emitter E is scattered by the object and is expected to be maximally detected by detector D, wherein each target position in the detection plane is a target position for both a forward emitter-detector pair (E, D1) and a backward emitter-detector pair (E, D2), that share a common emitter E situated between detectors D1 and D2 in the housing; and
a processor connected to said emitters and to said detectors, operable to synchronously activate emitter-detector pairs, to read the detected amounts of light from the detectors, and to calculate first and second respective locations of the object in the detection plane from the detected amounts of light, in accordance with a detection-location relationship, denoted $D^+ \rightarrow L$, that relates detections from forward emitter-detector pairs to object locations between neighboring target positions in the detection plane, and a detection-location relationship, denoted $D^- \rightarrow L$, that relates detections from backward emitter-detector pairs to object locations between neighboring target positions in the detection plane.

2. The proximity sensor of claim 1, wherein the detection-location relationships $D^+ \rightarrow L$ and $D^- \rightarrow L$ are non-linear.

3. The proximity sensor of claim 1, wherein said processor is further operable to calculate third and fourth respective locations of the object in the detection plane from the detected amounts of light, in accordance with a detection-location relationship, denoted $D_1 \rightarrow L$, that relates detections from emitter-detector pairs corresponding to neighboring target positions in the detection plane equally distant from the housing to object locations, and a second detection-location relationship, denoted $D_2 \rightarrow L$, that relates detections from emitter-detector pairs corresponding to neighboring target positions in the detection plane at different distances from the housing to object locations.

4. The proximity sensor of claim 3, wherein said processor is further operable to:
(i) combine detected amounts of light corresponding to a first pair of neighboring target positions and calculates a fifth location of the object between that first pair of neighboring target positions from the detected amounts of light in accordance with one of the detector-location relationships $D_1 \rightarrow L$ and $D_2 \rightarrow L$,
(ii) combine detected amounts of light corresponding to a second pair of neighboring target positions and calculates a sixth location of the object between that second pair of neighboring target positions from the detected amounts of light in accordance with that same one of the detector-location relationships $D_1 \rightarrow L$ and $D_2 \rightarrow L$, and
(iii) calculate a seventh location of the object from the first and second combined amounts of light in accordance with the other one of the relationships $D_1 \rightarrow L$ and $D_2 \rightarrow L$.

5. A proximity sensor for identifying a location of a proximal object, comprising:
a housing;
a plurality of light emitters, denoted E, mounted in said housing for projecting light out of said housing along a detection plane;
a plurality of light detectors, denoted D, mounted in said housing, operable when activated to detect amounts of light entering the housing along the detection plane, whereby for each emitter-detector pair (E, D), when an object is located at a target position p(E, D) in the detection plane, corresponding to the pair (E, D), then the light emitted by emitter E is scattered by the object and is expected to be maximally detected by detector D; and
a processor connected to said emitters and to said detectors, operable to synchronously activate emitter-detector pairs, to read the detected amounts of light from the detectors, and to calculate first and second respective locations of the object in the detection plane from the detected amounts of light, in accordance with a detection-location relationship, denoted $D_1 \rightarrow L$, that relates detections from emitter-detector pairs corresponding to neighboring target positions in the detection plane equally distant from the housing to object locations, and a detection-location relationship, denoted $D_2 \rightarrow L$, that relates detections from emitter-detector pairs corresponding to neighboring target positions in the detection plane at different distances from the housing to object locations.

6. The proximity sensor of claim 5, wherein the detection-location relationships $D_1 \rightarrow L$ and $D_2 \rightarrow L$ are non-linear.

7. The proximity sensor of claim 5, wherein said processor is further operable to:
   (i) combine detected amounts of light corresponding to a first pair of neighboring target positions and calculates a third location of the object between the first pair of neighboring target positions from the detected amounts of light in accordance with one of the detector-location relationships $D_1 \rightarrow L$ and $D_2 \rightarrow L$,
   (ii) combine detected amounts of light corresponding to a second pair of neighboring target positions and calculates a fourth location of the object between the second pair of neighboring target positions from the detected amounts of light in accordance with that same one of the detector-location relationships $D_1 \rightarrow L$ and $D_2 \rightarrow L$, and
   (iii) calculate a fifth location of the object from the first and second combined amounts of light in accordance with the other one of the relationships $D_1 \rightarrow L$ and $D_2 \rightarrow L$.

* * * * *